(12) United States Patent
Frerebeau et al.

(10) Patent No.: US 9,405,520 B2
(45) Date of Patent: Aug. 2, 2016

(54) METHOD FOR THE DYNAMIC CREATION OF AN EXECUTION ENVIRONMENT FOR AN APPLICATION TO SECURE THE APPLICATION, ASSOCIATED COMPUTER PROGRAM PRODUCT AND COMPUTING APPARATUS

(71) Applicant: THALES, Neuilly sur Seine (FR)

(72) Inventors: Laurent Frerebeau, Colombes (FR); Adrien Bioteau, Cholet (FR)

(73) Assignee: THALES, Neuilly sur Seine (FR)

( * ) Notice: Subject to any disclaimer, the term of this patent is extended or adjusted under 35 U.S.C. 154(b) by 0 days.

(21) Appl. No.: 14/245,880

(22) Filed: Apr. 4, 2014

(65) Prior Publication Data

US 2014/0223545 A1 Aug. 7, 2014

Related U.S. Application Data

(63) Continuation of application No. PCT/EP2012/069874, filed on Oct. 8, 2012.

(51) Int. Cl.
*G06F 7/04* (2006.01)
*G06F 9/445* (2006.01)
*G06F 21/53* (2013.01)
*G06F 21/54* (2013.01)
*G06F 21/52* (2013.01)
*G06F 21/31* (2013.01)

(52) U.S. Cl.
CPC *G06F 8/60* (2013.01); *G06F 21/31* (2013.01); *G06F 21/52* (2013.01); *G06F 21/53* (2013.01); *G06F 21/54* (2013.01)

(58) Field of Classification Search
CPC .......... G06F 21/54; G06F 21/53; G06F 21/52
USPC .......................................................... 726/16
See application file for complete search history.

(56) References Cited

U.S. PATENT DOCUMENTS

| | | |
|---|---|---|
| 6,836,888 B1 | 12/2004 | Basu et al. |
| 7,260,820 B1 | 8/2007 | Waldspurger et al. |
| 2002/0065776 A1* | 5/2002 | Calder et al. ............... 705/51 |

(Continued)

FOREIGN PATENT DOCUMENTS

WO  WO 2013/050600 A1  4/2013

OTHER PUBLICATIONS

International Search Report dated Nov. 22, 2012 for PCT/EP2012/069874.

*Primary Examiner* — Teshome Hailu
(74) *Attorney, Agent, or Firm* — Knobbe, Martens, Olson & Bear, LLP

(57) ABSTRACT

A method for the dynamic creation of an execution environment for an application to be secured, in order to secure the application, is implemented by a computing apparatus including an information processing unit and a memory. The memory is associated with the information processing unit and includes an operating system, the application to be secured and a security library including at least one security function, The operating system includes a set of unsecured function libraries, the application to be secured being adapted, during its execution, to call a function of the unsecured function library. The method including loading the security library, substituting, from among the function call(s) associated with the application to be secured, at least one call to an unsecured function with a call to a corresponding function of the security library, and launching the application to be secured after the substitution step.

13 Claims, 4 Drawing Sheets

(56) References Cited

U.S. PATENT DOCUMENTS

2002/0066021 A1    5/2002    Chien et al.
2007/0101435 A1*    5/2007    Konanka et al. ................. 726/27
2012/0159567 A1*    6/2012    Toy et al. ........................... 726/1

* cited by examiner

METHOD FOR THE DYNAMIC CREATION OF AN EXECUTION ENVIRONMENT FOR AN APPLICATION TO SECURE THE APPLICATION, ASSOCIATED COMPUTER PROGRAM PRODUCT AND COMPUTING APPARATUS

CROSS REFERENCE TO RELATED APPLICATIONS

This application is a continuation and claims benefit under 35 U.S.C. §§120 and 365 of PCT Application No. PCT/EP2012/069874, entitled "METHOD FOR THE DYNAMIC CREATION OF AN APPLICATION EXECUTION ENVIRONMENT FOR SECURING SAID APPLICATION, AND ASSOCIATED COMPUTER PROGRAM PRODUCT AND COMPUTING DEVICE," filed Oct. 8, 2012, which is herein incorporated by reference in its entirety and which claims priority to French Application No. 11 03046, entitled "METHOD FOR THE DYNAMIC CREATION OF AN APPLICATION EXECUTION ENVIRONMENT FOR SECURING SAID APPLICATION, AND ASSOCIATED COMPUTER PROGRAM PRODUCT AND COMPUTING DEVICE," filed on Oct. 6, 2011, which is incorporated herein by reference in its entirety.

BACKGROUND OF THE INVENTION

1. Field

The present invention relates to a method for the dynamic creation of an environment for executing an application to be secured, in order to secure the application, the method being implemented by a computing apparatus comprising an information processing unit and a memory, the memory being associated with the information processing unit and including an operating system, the application to be secured and a security library including at least one security function, the operating system including a set of function libraries comprising an unsecured function library, the application to be secured being adapted, during its execution, to call a function of the unsecured function library.

2. Description of the Related Technology

Embodiments also relate to a computer program product including software instructions which, when implemented by an information processing unit integrated into a computing apparatus, implements such a method.

Embodiments also relate to a computing apparatus comprising: an information processing unit, a memory, including an operating system, at least one application to be secured and a security library including at least one security function, the memory being associated with the information processing unit, the operating system including a set of function libraries comprising an unsecured function library, the application to be secured being designed to call a function from the unsecured function library.

A computing apparatus is known, such as a mobile terminal, of the aforementioned type. The mobile terminal can be managed by an Android platform hosting applications. The Android platform includes a Linux kernel, a set of function libraries in the C or C++ language, and a Dalvik virtual machine capable of executing applications hosted by the Android platform.

The operation of sensitive applications must be secured in order to protect the data processed by those applications and combat threats of information recovery resulting from the loss or theft of the mobile terminal, or the interception of communications between the mobile terminal and another piece of computing equipment. One data securing solution then consists of modifying the source or binary code of each of the applications to be secured so as to cause them to call specialized libraries including appropriate security functions.

However, such securing of the applications requires modifying the source or binary code of each of the applications, which is particularly restrictive, and is furthermore not always allowed by the provider of the application when the modification of the code is done by a third party.

SUMMARY OF THE INVENTION

One aim of the embodiments described herein is therefore to propose a method for the dynamic creation of an execution environment for an application to be secured and an associated computing apparatus making it possible to secure an application while limiting modifications to the code of the operating system, the application environment or the application to be secured.

In one aspect, the method for the dynamic creation of an execution environment can include the following steps, implemented by an application for the dynamic creation of the execution environment stored in the memory: loading the security library, substituting, from among the function call(s) associated with the application to be secured, at least one call to an unsecured function with a call to a corresponding function of the security library, and launching the application to be secured after the substitution step.

According to other advantageous aspects, the method comprises one or more of the following features, considered alone or according to any technically possible combination(s): the substitution step includes eliminating a dynamic link between the application to be secured and the unsecured function, and creating a dynamic substitution link between the application to be secured and the corresponding function of the security library; among the function call(s) associated with the application to be secured, all of the calls to a data storage function are substituted with calls to a security function of the data storage; among the function call(s) associated with the application to be secured, all of the calls to a function exchanging data with another computing apparatus are substituted with calls to a function securing data exchanges with the other computing apparatus; among the function call(s) associated with the application to be secured, all of the calls to a function to add debugging events are substituted with calls to a function to delete debugging events; the method further comprises, before the step for launching the application, a step for locking the security library loaded during the loading step and the function call substitution(s) done during the substitution step; the method further comprises, before the step for launching the application, a step for authenticating the user of the computing apparatus and recovering a key to unlock the security library; the method further comprises, before the step for launching the application, a step for intercepting a message exchange between the operating system and the application to be secured, and processing the message using a corresponding function of the security library; the application for creating the execution environment is an application dedicated to the application(s) to be secured, and is distinct from the operating system; the operating system includes a virtual machine adapted to execute the application; the operating system is Android, and the virtual machine is the Dalvik virtual machine.

An embodiment also relates to a computer program product including software instructions which, when implemented by an information processing unit integrated into a computing apparatus, implements a method as defined above.

An embodiment also relates to a computing apparatus of the aforementioned type, wherein the memory further includes an application for the dynamic creation of an execution environment for the application to be secured, the application for creating the execution environment including a component for loading the security library, a component for substituting, among the function call(s) associated with the application to be secured, at least one call to an unsecured function with a call to a corresponding function of the security library, and a component for launching the application to be secured after the substitution of the call to the unsecured function with the call to the security function.

BRIEF DESCRIPTION OF THE DRAWINGS

These features and advantages of the invention will appear upon reading the following description, provided solely as an embodiment, and in reference to the appended drawings, in which.

DETAILED DESCRIPTION OF THE PREFERRED EMBODIMENT

Figure 1:
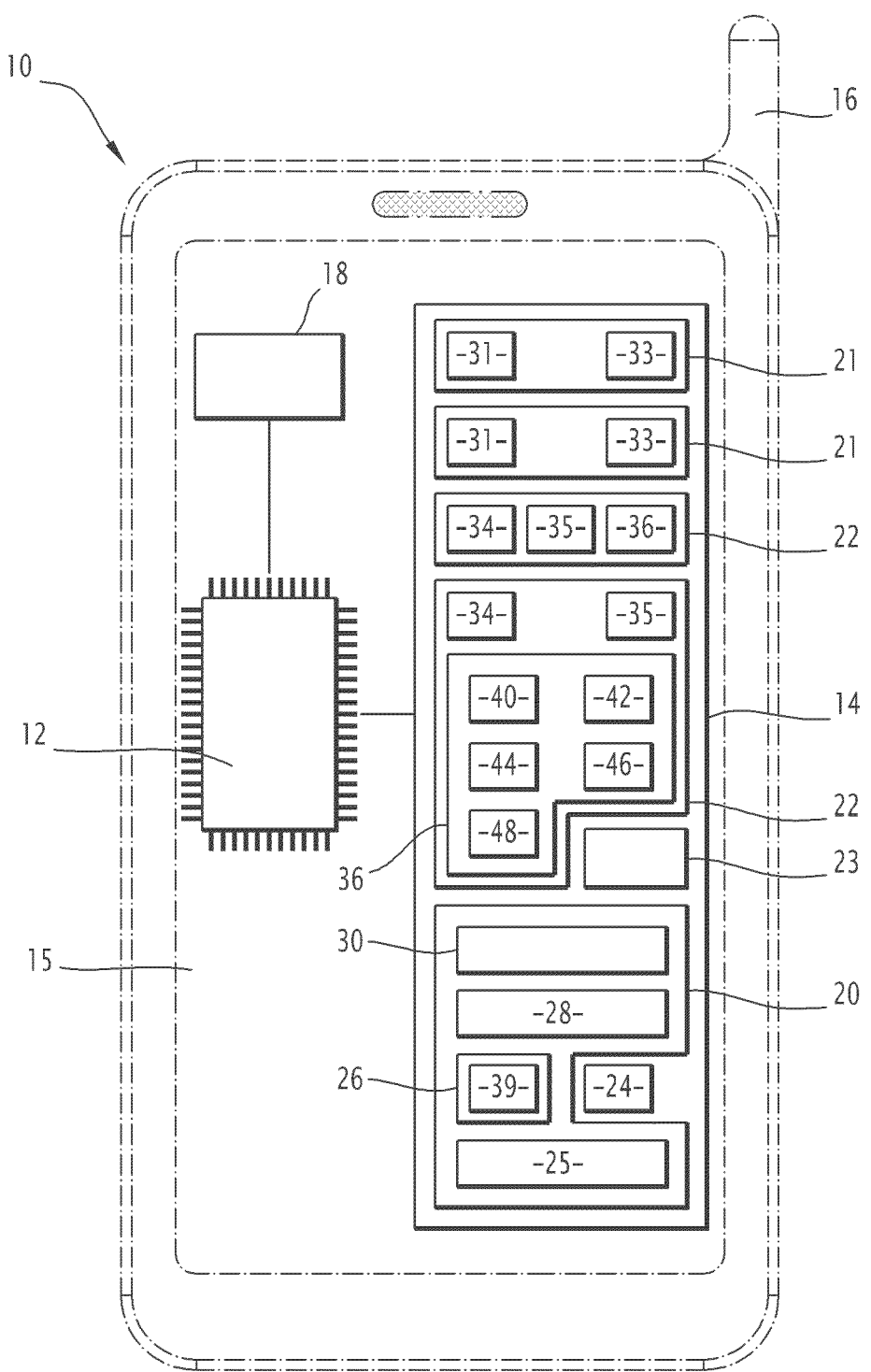
FIG. 1 is a diagrammatic view of a computing apparatus according to an embodiment.

In FIG. 1, a computing apparatus 10, such as a mobile terminal, comprises an information processing unit 12, a memory 14 associated with the information processing unit, and a screen 15.

In the example embodiment of FIG. 1, the computing apparatus 10 is a mobile telephone and further comprises a wireless antenna 16 and a wireless transceiver 18 that are connected to the information processing unit.

The information processing unit 12 for example includes a data processor.

The memory 14 includes an operating system 20 and multiple first package files 21 and second package files 22.

Additionally, the memory 14 includes a third package file 23.

The memory 14 also includes a security library 24 capable for example of securing the data storage and/or data exchange with another computing apparatus.

The wireless transceiver 18 includes a component for transmitting and receiving wireless signals via the wireless antenna 16. The wireless transceiver 18 can operate according to the GPRS (General Packet Radio Service) communication standard, or the UMTS (Universal Mobile Telecommunication System) standard.

The wireless antenna 16 and the wireless transceiver 18 are capable of allowing the establishment of a wireless link between the computing apparatus 10 and another computing apparatus including a wireless antenna and transceiver according to the same communication standard.

The operating system 20 includes a kernel 25, a set 26 of function libraries, a virtual machine 28 and an application framework 30.

Each first package file 21 includes a non-sensitive application 31 in the form of a first binary file and a first configuration file 33, the non-sensitive application 31 not needing to be secured.

Each second package file 22 includes an application to be secured 34 in the form of a second binary file, a second configuration file 35 and an application 36 for the dynamic creation of an execution environment for the application to be secured, the application for creating the execution environment 36 being in the form of a third binary file.

Additionally, the third package file 23 includes an application, not shown, for authenticating the user and recovering a key for unlocking the security library. The third package file 23 includes a third configuration file, not shown, associated with the application for authenticating the user and recovering the unlocking key. The authentication of the user is done, for example, using a chip card included in the apparatus 10, or a near field communication card, also called NFC card, outside the apparatus. The application is also adapted to verify the permissions associated with a third-party application to control access to that third-party application by the user.

Figure 2:
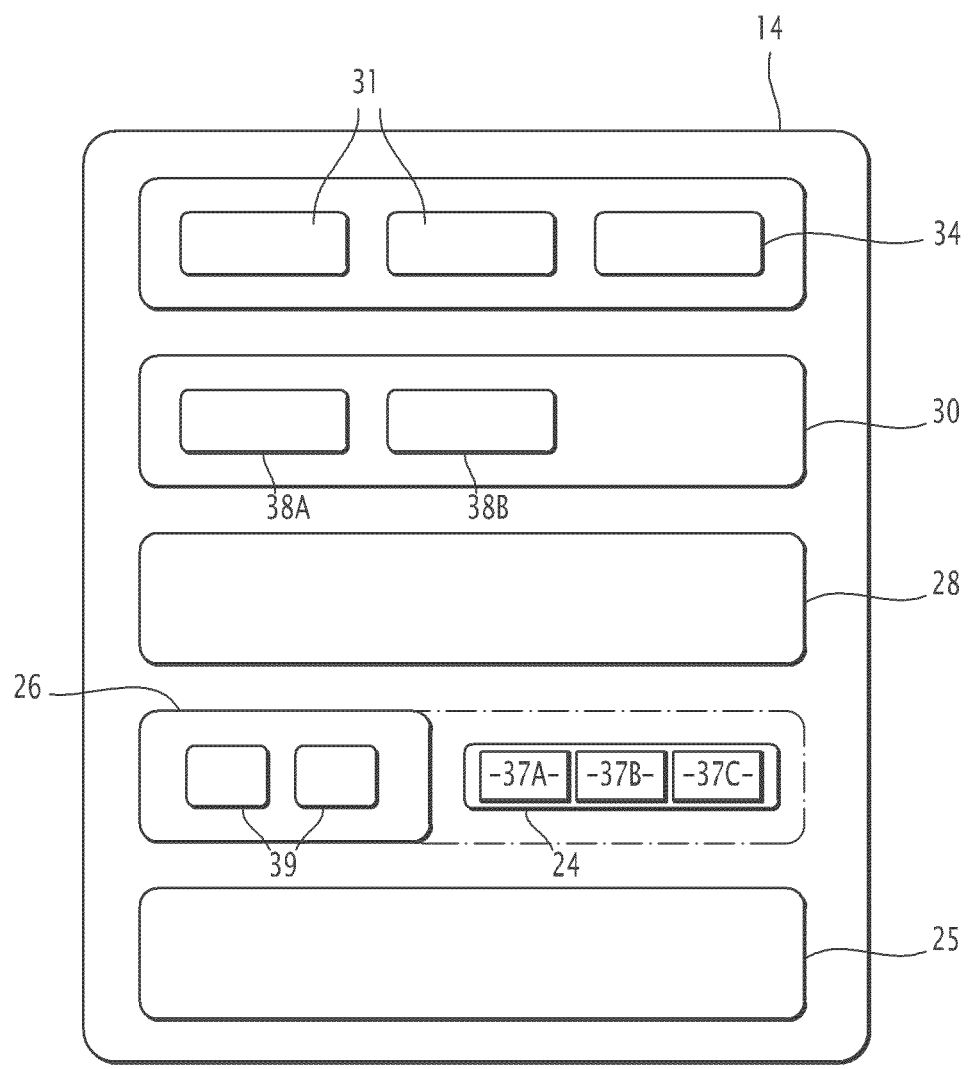
FIG. 2 is a diagrammatic illustration of a memory of the computing apparatus of FIG. 1.

The security library 24 includes a function 37A for securing the data storage, a function 37B for securing data exchanges with another computing apparatus, and a function 37C for eliminating debugging events, as shown in FIG. 2.

In the example embodiment of FIGS. 1 and 2, the security library 24 is a specific library separate from the native libraries included in the operating system 20.

Alternatively, as illustrated by the dotted lines in FIG. 2, the security library 24 is a native library included in the set of libraries 26 of the operating system delivered by the provider of the operating system.

As is known by one skilled in the art, the kernel 25 forms a layer of abstraction between a hardware part in particular including the information processing unit 12, the memory 14 and the wireless transceiver 18, on the one hand, and the rest of the operating system 20, in particular the set of libraries 26, on the other hand. The kernel 25 is suitable for managing essential services such as the security of the operating system, memory management, or process management.

The set of libraries 26 comprises an unsecure function library 39.

The virtual machine 28 is known by one skilled in the art, and is capable of executing each binary file contained in the respective package files 21, 22, 23.

The application host structure 30 includes services 38A, 38B available to the application 31, 34, 36, such as an activity management service 38A, a management service 38B for the package files associated with the application.

Each application 31, 34, 36 is in the form of a binary file including a binary code, also referred to as bytecode, designed to be executed by the virtual machine 28. The execution of the application 31, 34, 36 by the virtual machine 28 is an interpretation of the bytecode of the application.

Figure 4:
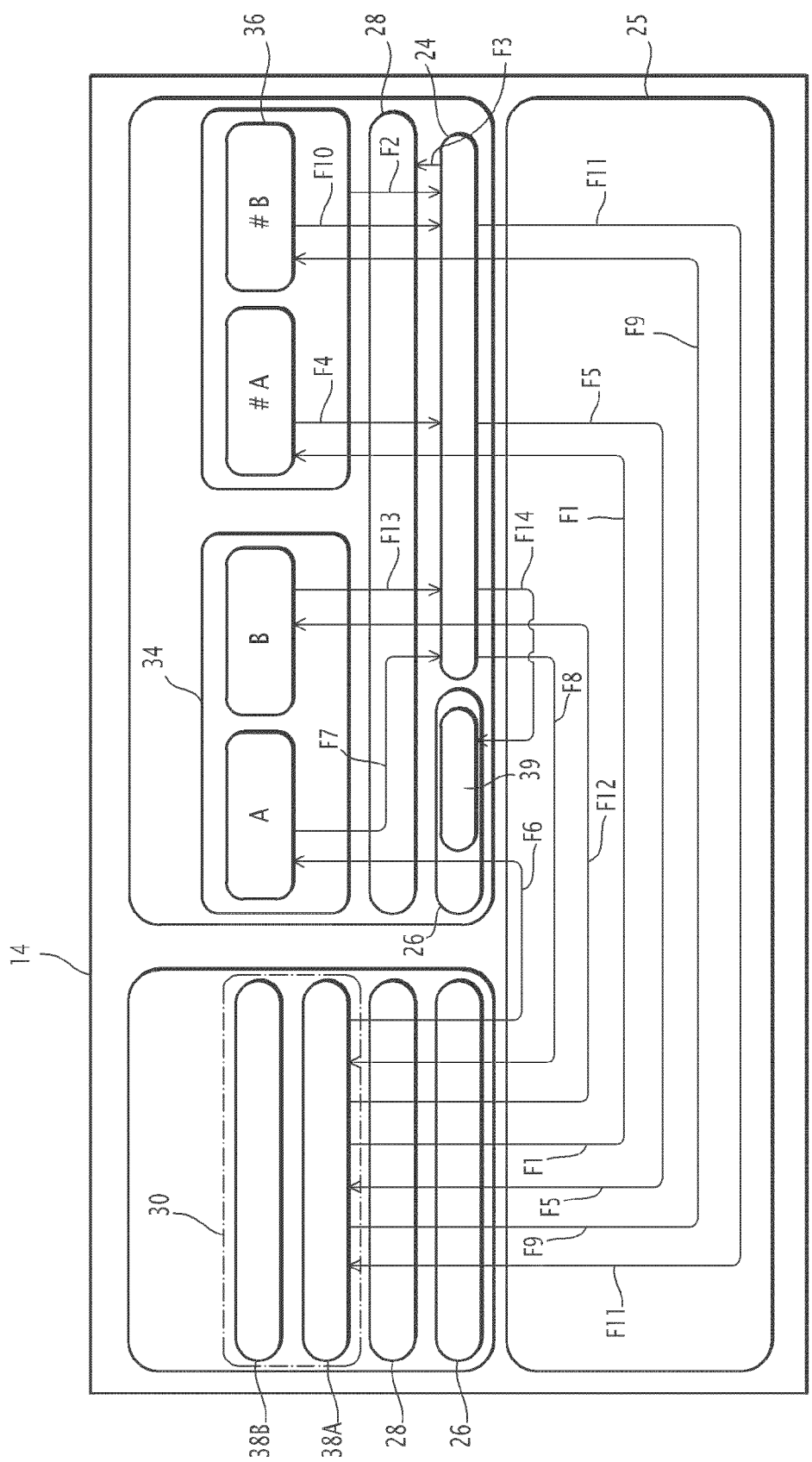
FIG. 4 is an illustration of the dynamic creation of the execution environment for the application to be secured and the execution of the application.

Each application 31, 34, 36 comprises one or more components A, B, #A, #B, as shown in FIG. 4, the components having different types, such as an activity, a service, a content provider, or a distribution receiver. Each component A, B, #A, #B plays a different role in the behavior of the application, and can be activated individually, even by other applications.

In the described embodiment, the operating system 20 is the Android® application system by Google. The kernel 25 is then based on a Linux kernel, more specifically on version 2.6 of the Linux kernel. The set of libraries 26 is written in the C/C++ computer language. The virtual machine 28 is the Dalvik virtual machine. The applications 31, 34, 36 are written in the Java language and are in the form of a binary code that is executable by the Dalvik virtual machine 28.

Alternatively, other embodiments apply to any operating system of the same type as the Android® operating system. In particular, some embodiments apply to an operating system including a kernel, a virtual machine designed to execute the applications, and a set of function libraries accessible by the kernel and the virtual machine.

The first configuration file 33 is known by one skilled in the art and includes information for naming and indicating the version of the application, information regarding the components of the application and message filters allowing the application to identify, in a predefined manner, certain messages among those received from the operating system 20 or other applications. In the case of Android®, the first configuration file 33 is also called Manifest file.

The application to be secured 34 is designed to call at least one function of the unsecure function library 36 during its execution.

The second configuration file 35 includes the same type of information as the first configuration file 33, and is further modified, so that the application for creating the execution environment 36 is launched in place of the application to be secured 34 during execution of the second package file 22 by the virtual machine 28.

Alternatively, the application to be secured 34 and the application for creating the execution environment 36 are encapsulated in two distinct package files, each application 34, 36 being encapsulated with a unique configuration file in a respective package file. The configuration file associated with the application to be secured 34 is modified so that the application for dynamically creating the execution environment 36 is initially executed instead of the application to be secured, and also in order to allow the execution of the application to be secured 34 in an existing process prepared by the application for creating the execution environment 36.

The application for the dynamic creation of the environment 36 includes a component 40 for loading the security library, and a component 42 for substituting, among the function call(s) associated with the application to be secured 34, at least one call to an unsecure function with a call to a corresponding function from the security library 24.

Additionally, the application for creating the execution environment 36 includes a component 44 for authenticating the user of the computing apparatus and recovering an unlocking key for the security library, and a component 46 for intercepting and processing a message related to the placement of the application to be secured 34 on standby or waking it up.

The application for creating the execution environment 36 includes a component 48 for launching the application to be secured following the substitution of the call to the unsecure function with the call to the security function.

The application for creating the execution environment 36 is an application dedicated to the application(s) to be secured 34, and is distinct from the operating system 20.

The function for securing the data storage 37A is capable of protecting sensitive data stored in a memory area of the memory 14, for example via encryption of the stored data. The protection is confidentiality protection order to prohibit access to that data by an unauthorized person, and also integrity protection in order to prevent any modification of the content of that data.

The function for securing data exchanges 37B is capable of protecting data exchanges between the application to be secured 34 and the other computing apparatus, not shown.

The function for deleting debugging events 37C is capable of deleting the debugging events before they are saved in the memory 14, the debugging events being generated during the execution of tags contained in the code of the application to be secured 34. These debugging events, which are used to determine the code of the application before the code is finalized, are sometimes kept in the application code, and are then capable of causing a security breach.

The unsecure function library 39 is known by one skilled in the art. In the case of an Android® operating system, the unsecure function library 39 is a library of function(s) written in the C/C++ computer language.

In the example embodiment of FIG. 1, the authentication and recovery component 44 is a component for calling the authentication application for the user and recovering the unlocking key encapsulated in the third package file 23. In other words, the authentication and recovery component 44 includes only one point of entry toward the application for authenticating the user and recovering the key.

Alternatively, the memory 14 does not include the third package file, and the authentication and recovery component 44 of each application for creating the execution environment comprises the functionalities of the application for authenticating the user and recovering the unlocking key, and is capable of authenticating the user of the apparatus 10, then, in case of successful authentication, recovering the unlocking key from the security library 24.

The operation of the computing apparatus 10 according to an embodiment will now be explained using FIGS. 3 and 4.

Before being stored in the memory 14, each second package file 22 is created using an application for creating the package file. The application for creating the package file is a third-party application outside the computing apparatus, and is capable of creating the package file 22 for the application to be secured from an initial package file of the application to be secured 34 including the application to be secured 34 and an initial configuration file similar to the first configuration file 33.

The third-party application for creating the package file creates the second configuration file 35 by modifying the initial configuration file, so that the application for creating the execution environment 36 is launched in place of the application to be secured 34 during the execution of the second package file 22.

The third-party creation application then builds the second package file 22 by adding, to the aforementioned second configuration file 35, the second binary file corresponding to the application to be secured and the third binary file corresponding to the application for creating the execution environment 36. Additionally, the third-party creation application also adds the security library 24 into the second package file 22.

The third-party creation application lastly signs the second package file 22 previously built.

Figure 3:
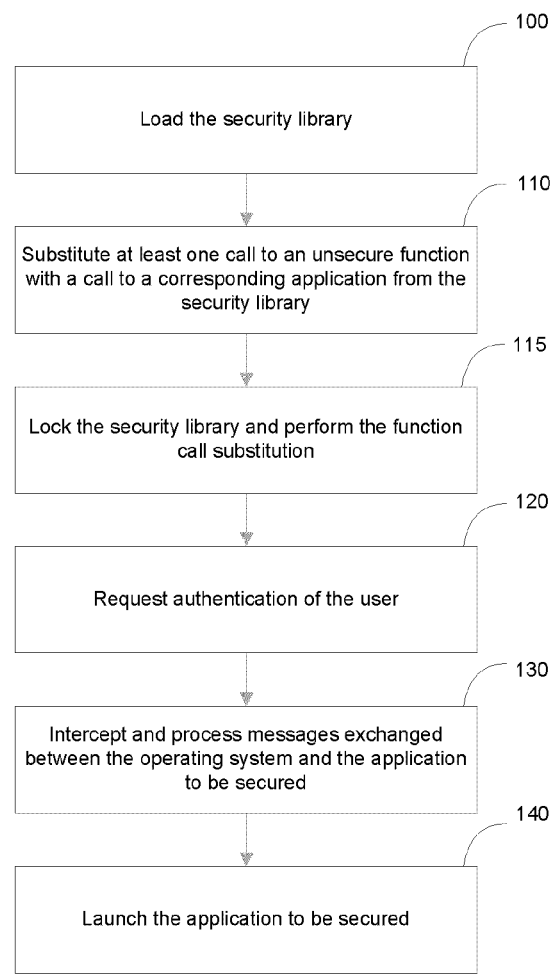
FIG. 3 is a flowchart of a method for the dynamic creation of an execution environment for an application to be secured, according to an embodiment.

FIG. 3 illustrates a method for the dynamic creation of an execution environment for the application to be secured 34 implemented by the application for creating the execution environment 36.

During the initial step 100, the security library 24 is loaded so that the security functions 37A, 37B, 37C contained in the security library 24 are available for the virtual machine 28 during the subsequent launch of the application to be secured 34.

The application for creating the execution environment 36 next substitutes, during step 110, at least one call to an unsecure function, among the call(s) to functions associated with the application to be secured 34, with a call to a corresponding application 37A, 37B, 37C from the security library 24 previously loaded.

The substitution step 110 for example includes the deletion of the dynamic link between the application to be secured 34 and the unsecured function, and the creation of a dynamic substitution link between the application to be secured 34 and the corresponding function 37A, 37B, 37C of the security library 24.

In the described embodiment, all of the calls to a data storage function among the function calls associated with the application to be secured 34 are substituted with calls to the security function for data storage 37A.

All of the calls to a data exchange function with another computing apparatus among the function calls associated with the application to be secured 34 are substituted with calls to the data exchange securing function 37B.

All of the calls to a function to add a debugging event among the function calls associated with the application to be secured 34 are substituted with calls to the function to delete debugging events 37C.

Additionally, the application for creating the execution environment 36 next, during step 115, locks the security library 24 loaded during step 100 and performs the function call substitution(s) done during the preceding step 110.

When the substitution step 110 is carried out via the introduction of a substitution function into the application to be secured itself or into the virtual machine 28 via a dynamic link, the substitution function coming from the application for creating the execution environment 36, the locking step for example consists of replacing the reference of the substitution function with a reference to a new substitution function.

The code corresponding to the code in steps 110 and 115, as well as to the new substitution function and the security functions, is positioned in the security library 24. This new substitution function performs filtering on the substitution requests, refusing to substitute the function calls processed in step 110, and allowing the substitution of the other function calls.

Additionally, the application for creating the execution environment 36 next requests, during step 120, the authentication of the user of the computing apparatus 10, then in case of successful authentication, recovers a key for unlocking the security library 24.

Additionally, during step 130, the application for creating the execution environment 36 intercepts and processes the messages exchanged between the operating system and the application to be secured, the messages being processed by the security library 24. The intercepted messages in particular relate to the placement in standby, the waking up of the application to be secured 34, the storage of data in the memory 14 and the exchange of data with another computing apparatus.

The application for creating the execution environment 36 lastly, during step 140, launches the application to be secured 34.

After the launch of the application to be secured 34 and through the substitution(s) previously done of call functions, the corresponding call(s) generated by the application to be secured 34 or intended for the application to be secured, optionally via the operating system 20, are first sent to the security library 24, and if the latter authorizes it, if needed to the unsecure library 39.

The creation of the execution environment for the application to be secured 34 is dynamic, given that it is carried out upon each execution of the application and following the reception by the operating system 20 of an order to execute the application.

FIG. 4 is an illustration of the dynamic creation of the execution environment for the application to be secured 34 and the execution of the application.

Following reception by the operating system 20 of an order to execute the second package file 22, the operating system begins by launching the component #A of the application for creating the execution environment 36 using the activity management service 38A (arrow F1), according to the information contained in the second modified configuration file 35, so that the application for creating the execution environment 36 is launched in place of the application to be secured 34.

The application for creating the execution environment 36 downloads the security library 24 (arrow F2), according to the initial step 100 of the method for creating an execution environment. The security functions 37A, 37B, 37C contained in the security library are thus available for the subsequent actions of the virtual machine 28. The dynamic links between the application to be secured 34 and certain unsecured functions are deleted, and the corresponding dynamic substitution links are created between the application to be secured 34 and the corresponding function 37A, 37B, 37C of the security library 24, according to step 110 previously described (arrow F3).

The component #A next requests, from the operating system, the launch of the corresponding component A of the application to be secured 34 (arrow F4). This request is intercepted by the security library 24 in order to request authentication of the user, then, in case of successful authentication, to recover the key to unlock the security library 24. In the event of successful authentication of the user, the request is transmitted to the activity management service 38A of the operating system (arrow F5).

The operating system 20 then launches the component A of the application to be secured 34 using the activity management system 38A, according to step 140 previously described (arrow F6). The launch is done in the same process as that of the application for creating the execution environment 36 according to the information contained in the second configuration file 35.

During the execution of the application to be secured 34, the component A requests, from the operating system 20, the launch of the component B, and that request is then directed by the virtual machine 28 to the security library 24 (arrow F7) through the preceding step for substituting dynamic links. The request is then modified by the security library 24 so that the operating system 20 launches the component #B instead of the component B of the application to be secured 34, then sent to the activity management service 38A (arrow F8). The operating system 20 then launches the component #B (arrow F9).

The component #B then requests, from the operating system, the launch of the corresponding component B of the application to be secured 34 (arrow F10). This request is intercepted by the security library 24 in order to perform the corresponding secure processing, then sent to the activity management service 38A of the operating system (arrow F11).

The operating system 20 then launches the component B of the application to be secured 34 using the activity management service 38A (arrow F12). The component B, next wishing to store a data file, to that end calls a storage function (arrow F13). Through the preceding substitution step for dynamic links, the security function for the data storage 37A of the security library is then automatically called, and the data file is encrypted by the security function 37A before being stored in the memory 14 (arrow F14).

One skilled in the art will understand that if the component had wished to exchange data with another computing apparatus and had to that end called a data exchange function, then the data exchange security function 37B would, similarly, have been called automatically through the preceding step for substituting dynamic links.

One skilled in the art will understand that if the component had wished to add debugging events and had to that end called a function for adding debugging events, then the function for deleting debugging events 37C would, similarly, have been called automatically through the preceding step for substituting dynamic links.

In the example embodiment of FIG. 4, the different requests described are done in administrator mode and then pass through the kernel 25. One skilled in the art will understand that certain requests are, alternatively, capable of being made in user mode without passing through the kernel 25.

The computing apparatus 10, via the implementation of the method for dynamically creating the environment for executing the application to be secured 34 using the application for creating the execution environment 36, therefore makes it possible to secure the operation of the application 34, in particular regarding the launch of the components, the storage of data or the exchange of data with another computing apparatus, the latter being automatically encrypted via the appropriate functions of the security library 24.

This securing of the application 34 only requires rewriting the configuration file of the application (called Manifest file in the case of Android®), adding the application for creating the execution environment 36, the latter being encapsulated in the package file of the application to be secured 34, or alternatively in a separate package file, and adding the security library 24, if the set of libraries 26 does not already include such a library.

One skilled in the art will note that this securing does not require any modification of the source or binary code of the application to be secured 34, or any modification of the operating system 20.

One can see that the method for the dynamic creation of an environment for executing an application to be secured and the computing apparatus 10 make it possible to secure the application 34 while limiting the modifications of the code of the operating system, the application environment or the application to be secured.

Although the method for the dynamic creation of the execution environment for the application to be secured and the computing apparatus according the invention have been described in relation with an operating system including a virtual machine capable of executing the application, one skilled in the art will understand that the invention also applies to an operating system not including a virtual machine, the application then being executed directly by the processor of the information processing unit.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. A method for the dynamic creation of an execution environment for an application to be secured, in order to secure the application, the method being implemented by a computing apparatus comprising an information processing unit and a memory, the memory being associated with the information processing unit and including an operating system, the application to be secured and a security library including at least one security function, the operating system including a set of function libraries comprising an unsecured function library, wherein the application to be secured is configured, during its execution, to call a function of the unsecured function library,
   wherein the method is implemented by an application for the dynamic creation of the execution environment stored in the memory, and wherein the method comprises:
   loading the security library,
   substituting, from among the function call(s) associated with the application to be secured, at least one call to an unsecured function with a call to a corresponding function of the security library,
   launching the application to be secured after the substitution step.

2. The method according to claim 1, wherein the substitution includes eliminating a dynamic link between the application to be secured and the unsecured function, and creating a dynamic substitution link between the application to be secured and the corresponding function of the security library.

3. The method according to claim 1, wherein, among the function call(s) associated with the application to be secured, all of the calls to a data storage function are substituted with calls to a security function of the data storage.

4. The method according to claim 1, wherein, among the function call(s) associated with the application to be secured, all of the calls to a function exchanging data with another computing apparatus are substituted with calls to a function securing data exchanges with the other computing apparatus.

5. The method according to claim 1, wherein, among the function call(s) associated with the application to be secured, all of the calls to a function to add debugging events are substituted with calls to a function to delete debugging events.

6. The method according to claim 1, wherein the method further comprises, before the launching of the application, locking the security library loaded during the loading step and the function call substitution(s) done during the substitution step.

7. The method according to claim 1, wherein the method further comprises, before the launching of the application, authenticating the user of the computing apparatus and recovering a key to unlock the security library.

8. The method according to claim 1, wherein the method further comprises, before the launching of the application, intercepting a message exchange between the operating system and the application to be secured, and processing the message using a corresponding function of the security library.

9. The method according to claim 1, wherein the application for creating the execution environment is an application dedicated to the application(s) to be secured, and is distinct from the operating system.

10. The method according to claim 1, wherein the operating system includes a virtual machine configured to execute the application.

11. The method according to claim 10, wherein the operating system is Android and the virtual machine is the Dalvik virtual machine.

12. A computer program product including software instructions which, when implemented by an information processing unit integrated into a computing apparatus, implements a method for the dynamic creation of an execution environment for an application to be secured, in order to secure the application, the computing apparatus comprising a memory, the memory being associated with the information processing unit and including an operating system, the application to be secured and a security library including at least one security function, the operating system including a set of function libraries comprising an unsecured function library, wherein the application to be secured is configured, during its execution, to call a function of the unsecured function library, wherein the method is implemented in the information processing unit by an application for the dynamic creation of the execution environment stored in the memory, and wherein the method comprises:

loading the security library, substituting, from among the function call(s) associated with the application to be secured, at least one call to an unsecured function with a call to a corresponding function of the security library, and launching the application to be secured after the substitution step.

13. A computing apparatus comprising:

an information processing unit, a memory including an operating system, at least one application to be secured and a security library including at least one security function, the memory being associated with the information processing unit, the operating system including a set of function libraries comprising an unsecured function library, wherein the application to be secured is configured to call a function of the unsecured function library, wherein the memory further includes an application for the dynamic creation of an execution environment for the application to be secured, the application for creating the execution environment including a loading component configured to load the security library, a substitution component configured to substitute, among the function call(s) associated with the application to be secured, at least one call to an unsecured function with a call to a corresponding function of the security library, and a launching component configured to launch the application to be secured after the substitution of the call to the unsecured function with the call to the security function.

\* \* \* \* \*